Jan. 16, 1951  S. H. BOGGS  2,538,230
LAWN TRIMMER

Filed Dec. 29, 1947  2 Sheets-Sheet 1

SAM H. BOGGS
INVENTOR.

BY
ATTORNEY

Jan. 16, 1951 S. H. BOGGS 2,538,230
LAWN TRIMMER
Filed Dec. 29, 1947 2 Sheets-Sheet 2

SAM H. BOGGS
INVENTOR.

BY
ATTORNEY

Patented Jan. 16, 1951

2,538,230

UNITED STATES PATENT OFFICE 2,538,230

LAWN TRIMMER

Sam H. Boggs, Dallas, Tex.

Application December 29, 1947, Serial No. 794,266

5 Claims. (Cl. 56—25.4)

1

This invention relates to new and useful improvements in lawn trimmers for trimming the vegetation, such as grass, along walks, drives, curbs and the like; and more particularly to a power driven rotary trimmer.

One object of the invention is to provide an improved power driven rotary lawn trimmer of the character described, having improved and novel cutting means; wherein said cutting means includes a plurality of flexible wires carried by a rotating hub and driven at a high angular velocity to "whip" or cut off grass along the edges of walks, driveways, curbs and the like.

An important object of the invention is to provide an improved lawn trimmer, of the character described, wherein the flexible cutting wires are loosely mounted on the hub so as to be freely swingable thereon to reduce breakage and to accommodate misalignment of the cutting device with the edge of the walk or drive or curb along which the grass is being trimmed.

Another object of the invention is to provide in a lawn trimmer of the character described an improved simple mounting for the flexible cutting wires, whereby such cutter wires may readily be installed or replaced when worn or broken.

A further object of the invention is to provide a lawn trimmer of the character described wherein the cutting head of the trimmer is reversible in position on the carrier, whereby the trimmer may be used for trimming along the edges of walks, curbs, drives and the like in opposite directions.

Still another object of the invention is to provide in a lawn trimmer of the character described means for adjusting the height of the cutting head, whereby the position of the cutter wires with respect to the lawn being trimmed may be controlled and adjusted, to assure proper trimming of grass.

A still further object of the invention is to provide in a lawn trimmer of the character described a protective shield for the high speed rotating cutter wires for preventing injury to the user of the trimmer, said shield also being reversible when the cutter head is reversed so that the shield functions to protect the user against the high speed rotating cutter wires in either position.

Additional objects and advantages of the invention will readily be apparent from the reading of the following description of a device constructed in accordance with the invention, and reference to the accompanying drawings thereof, wherein:

2

Figure 1:
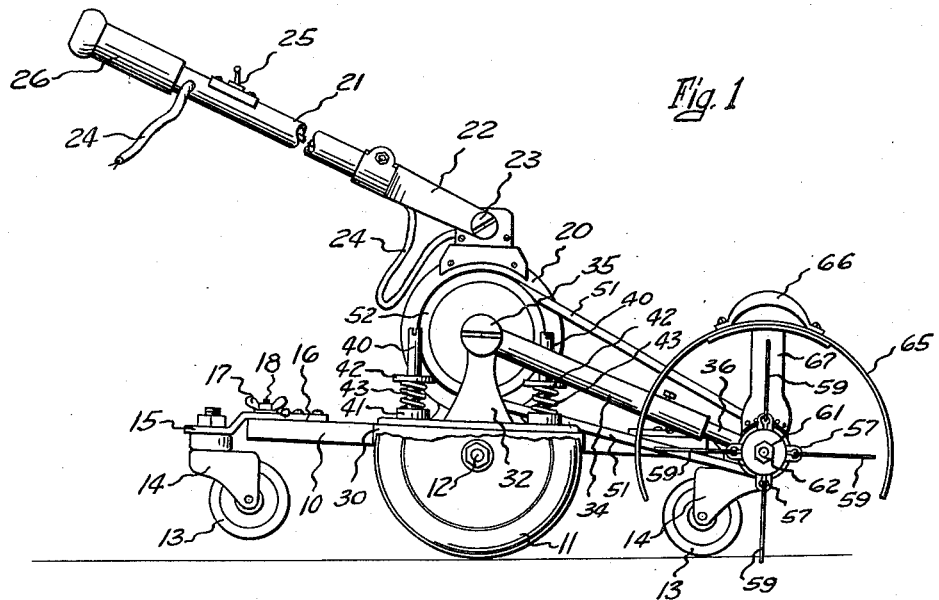
Figure 2:
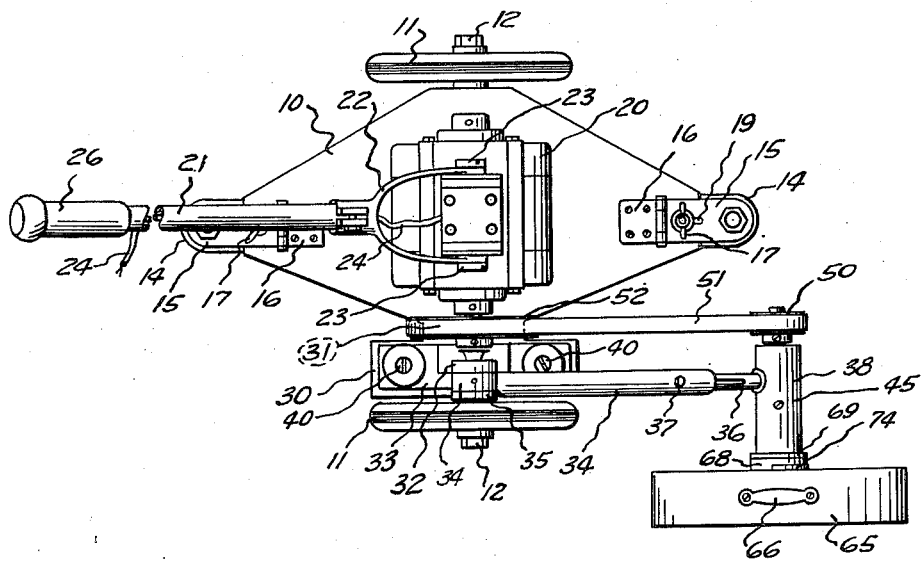
Figure 3:
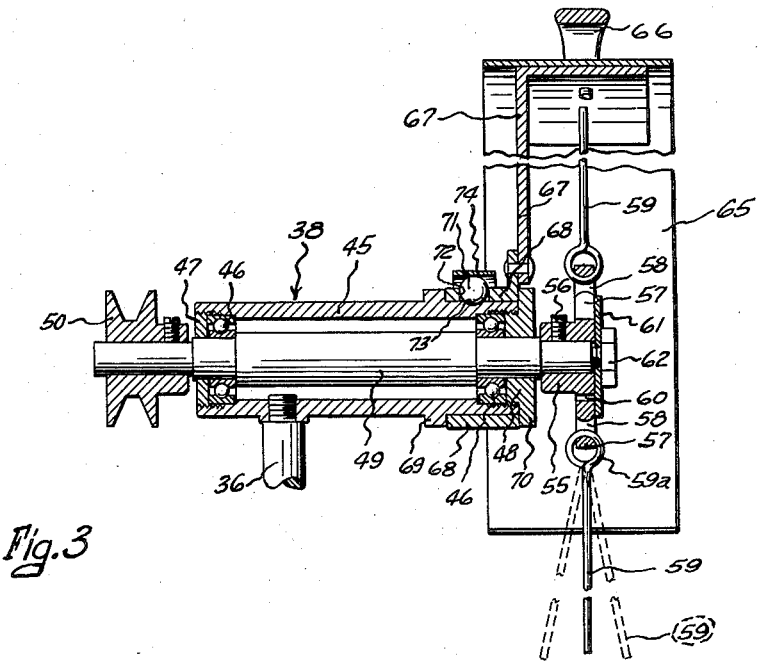
Figure 4:
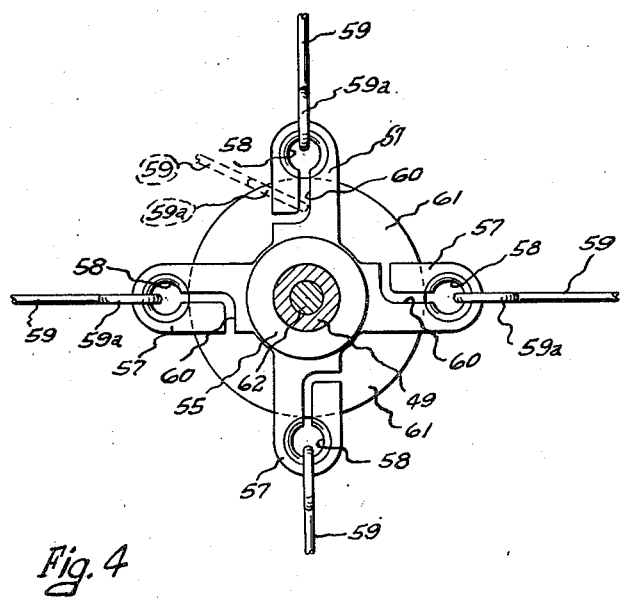

Figure 1 is a side view, in elevation, of a lawn trimmer constructed in accordance with the invention, Figure 2 is a plan view of the same, Figure 3 is a view, partly in elevation and partly in section, of the cutter head, and Figure 4 is a view, partly in elevation and partly in section, of the cutter wire carrier hub.

The numeral 10 designates a base plate or frame, which is preferably substantially diamond-shaped. A pair of ground wheels 11 are mounted on an axle 12 which is secured in any desirable manner to the underside of the frame member substantially centrally thereof. The ground wheels preferably are rubber tired to facilitate movement of the device. One of a pair of smaller caster wheels 13 is eccentrically mounted in a frame 14 at each end of the base plate 10, the carrier 14 being secured in each case near the outer end of a swingable half 15 of a hinge member 16 having its other half secured to the base member 10. The caster wheels 13 are so positioned and arranged that when one of the caster wheels is in contact with the ground the other wheel is spaced from the ground, whereby the base plate 10 is tiltable about the axis of the ground wheel axle 12. Wing nuts 17 are threaded onto bolts 18 which extend upwardly through slots 19 in the movable hinge sections 15, for holding the movable hinge section in the position shown in Figures 1 and 2. When the wing nuts 17 are removed, the swingable hinge sections 15 may be lifted to completely swing the caster wheels upwardly and out of supporting position.

A power unit or motor 20 is mounted on the upper surface of the base plate 10 substantially centrally thereof and with its drive shaft projecting parallel to the axle 12 on which the ground wheels are mounted, whereby the drive shaft extends transversely of the longitudinal axis of the base plate. The power unit may be an electric motor, a small internal combustion engine or any other suitable desired source of power, but is shown as being an electric motor. An elongate tubular handle 21 has a U-shaped yoke 22 releasably secured at its inner end, and the yoke is swingably mounted by bolts 23 to the upper portion of the frame or housing of the motor 20. An electrical conductor cord 24 from the motor extends longitudinally through the handle to a point near its outer end, where it is connected to a switch 25 for controlling the flow of electricity from a source of power to the motor. The cord then extends outwardly through a lateral opening near the outer end of the handle. A grip piece 26 is fixed on the extreme outer end of the handle, whereby the user may manually maneuver the device.

An elongate rectangular side plate 30 is preferably formed integral with the base plate 10, being connected thereto by a throat piece or neck 31, and said side piece extends parallel to the longitudinal axis of the base member. An upright post member 32, having a large rectangular base 33, is supported upon the upper surface of the side piece 30 and an elongate supporting arm 34 is pivotally connected at one end to the upper end of the post 32 by means of a bolt 35. The outer portion of the arm 34 is tubular and receives a shaft 36 which is slidable therein and is held in adjusted positions longitudinally of the arm by means of a set screw 37. A cutter head 38 is carried on the outer end of the shaft 36, as is clearly shown in Figure 2.

A pair of upstanding supporting screws 40 are threaded into bosses 41 formed in the base 33 on each side of the upright post. Each supporting screw is provided with a central radial flange 42 formed integral with the screw and adapted to be engaged by and to support the elongate supporting arm 34, as clearly shown in Figures 1 and 2. The supporting screws are movably held in various adjusted positions by coil springs 43 interposed between the flanges 42 and the bosses 41, whereby each of said screws is prevented from readily moving from any desired adjusted position by the frictional engagement of the spring with said flange and the boss.

As best shown in Figure 3, the cutter head 38 includes an elongate substantially cylindrical housing 45 having bearings 46 at each end releasably retained in the housing by a retaining bushing 47 at the inner end of the housing and a similar retaining bushing 48 at the outer end of the housing. The bearings rotatably support a cutter shaft 49 which extends axially through the housing. A driven pulley 50 is mounted on the inner end of the shaft 49 and is connected by means of a belt 51 to a large driving pulley 52 which is mounted on the drive shaft of the motor of power unit 20, whereby the motor drives the cutter shaft.

A cutter hub 55 is removably mounted on the outer end of the cutter shaft 49, being secured thereon by a set screw 56. The cutter hub is provided with a plurality of radially extending cutter carrier arms 57, which are shown in the drawings as being four in number but may be provided in any desired number. Cutter wire receiving openings 58 are formed at the outer end of each carrier arm 57 for receiving and supporting cutter wires 59. The cutter wires are preferably formed of resilient or spring wire, for reasons which will be hereinafter more fully explained. Wire inserting slots 60 extend radially inwardly of each carrier arm from the openings 58 and are then turned at substantially right angles to extend to one edge of the carrier arm, as is shown in Figure 4, to provide substantially L-shaped wire inserting slots by means of which the eye loops 59a of the cutter wires 59 may be slipped into the openings 58 at the outer end of the carrier arms 57. A retaining washer 61 is supported against the outer surface of the hub 55 and is of such a diameter that it extends substantially to the openings 58 in the supporting arms 57, whereby the inserting slots 60 are covered by said washer to prevent the cutter wires 59 from slipping out of the openings 58 through said inserting slots. The washer is held in place by a bolt 62 which is threaded into the outer end of the cutter shaft 49 and presses the washer against the hub.

The openings 58 through the carrier arms 57 are preferably flared on each side, as best shown in Figure 3, to accommodate the curvature of the eye loops 59a of the cutter wires. The end of the wire at each of the eye loops of the cutter wires is welded to the main portion of the wire to completely and positively close the eye, to prevent the eye loops from spreading open when the cutter wires are revolved at high speed.

An arcuate shield member 65, having a handle 66 mounted thereon, is supported on an arm 67 which has a cylindrical sleeve 68 at its lower end. The sleeve 68 is slidably mounted on the outer end of the tubular housing 45 of the cutter head, being retained in position thereon between an external annular collar 69 formed on the housing and an external annular flange 70 formed on the retaining bushing 48 at the outer end of the housing. A ball catch member 71 is mounted in an opening 72 formed in the sleeve 68 and is adapted to engage in a recess 73 formed in the outer surface of the housing 45 to retain the arm 67 in position for supporting the shield 65 in the shielding position shown in Figures 1 and 2. The ball is pressed inwardly against the housing 45 by a leaf spring 74 secured at one end to the sleeve 68 and engaging over the ball.

If desired, the cutter head may be swung from the position shown in Figure 2 to a position near the opposite end of the frame member 10 by swinging the supporting arm 34 about the bolt 35 at the upper end of the upright post 32 until the supporting arm engages the flange 42 on the supporting screw 40 on the opposite side of said post. Thus, the cutting device may be reversed in direction, or may be used to cut the opposite edge of a walk without being moved off the walk. A depression similar to the depression 73 is formed in the housing at a point spaced from the depression 73 so that the locking ball 71 may engage in said depression to reposition the shield 65 in proper shielding position when the cutter arm is swung in the manner just described.

In use, when the motor or power unit 20 is in operation, the pulley 52 drives the belt 51 to turn the pulley 50 and rotate the shaft 49 on which said pulley is mounted. As the shaft 49 is rotated, the cutter hub 55 is likewise rotated and the carrier arms 57 are swung about the shaft. The cutter wires 59 carried at the outer end of each of the carrier arms 57 are thus swung rapidly about the shaft 49 and the centrifugal force created by such rotation maintains the cutter wires in substantially the planar position shown in Figures 1 and 3. The high speed at which the cutter wires are swung will cause the wires to "whip" or cut off grass or other vegetation with which they come into contact.

The weight of the cutter head will normally tend to tilt the frame member or base plate 10 downwardly in the manner illustrated in Figure 1, whereby the caster wheel 13 on the end of the frame member nearest which the cutter head is supported will be moved into contact with the ground, sidewalk, or the like to prevent further tilting of the frame member. The height of the cutter head above the ground may be adjusted by adjusting the position of the flanges 42 on the supporting screws 40 to raise and lower the arm 34 until the outer ends of the cutter wires 59 are positioned in proper cutting relationship with the vegetation to be cut. The tip ends of the cutter wires, which travel at high speed, may thus be set to "whip" or cut off such vegetation.

Since the cutter head is so positioned that the cutter wires are revolved in a plane spaced laterally beyond the ground wheel 11, it will be seen that the ground wheels may remain on the walk, drive or the like and that the cutter wires may be moved along the edge of such walk or drive to trim the grass or other vegetation along the edge thereof.

It is not necessary that the flexible resilient cutter wires be provided with sharpened cutting edges. The high speed at which the tips of the wires travel causes such tip ends to slice or "whip" off the vegetation with which they come in contact, so that the wires may be, and preferably are, smooth round material without sharpened edges.

Due to the resiliency of the cutter wires 59, and their loose mounting in the cutter hub 55, it is believed manifest that the cutter wires may be displaced laterally from the plane of the hub, in the manner illustrated in dotted lines in Figure 3, whereby misalignment of the cutter wires with the edge of the walk or drive may be accommodated without damage to the device. Thus, the cutter hub and wires need not be accurately aligned with the edge of the walk to cut or trim the grass therealong.

Furthermore, it is highly preferable that the cutter wires be loosely mounted on the cutter hub, whereby they may readily swing in the openings 58 in the radial carrier arms 57 of the hub. Thus, the cutter wires are not required to flex but may swing freely and easily in the opening, and any tendency to break the cutter wires is substantially reduced or eliminated.

Manifestly, should one of the cutter wires break, or should all the cutter wires become sufficiently worn to require replacement, it is only necessary to unscrew the bolt 62 from the end of the cutter shaft 49 and remove the washer 61 which covers the inserting slots 60. The eye loops 59a of the cutter wires may then be slipped outwardly from the openings 58 along such slots to disengage the cutter wires from the cutter carrier arms. New wires may then be reinserted through the inserting slots 60 into place in the openings 58 and the disc or washer 61 replaced and secured in position by means of the bolt 62, whereupon the cutting device is again ready for use.

From the foregoing, it will be seen that an improved power driven rotary lawn trimmer has been provided having novel cutting means, said cutting means including a plurality of flexible wires swingably carried by a rotating hub and driven at high angular velocity to "whip" or cut off grass along the edges of walks, driveways, curbs and the like. It will further be seen that the loop mounting of the flexible cutting wires permits the wires to swing freely on the hub to reduce breakage or damage to said wires and to accommodate misalignment of the cutting device with the edge of the walk, or drive or curb, along which the device is being used to trim the vegetation. Furthermore, it will be seen that an improved simple mounting for the flexible cutting wires has been provided whereby such cutter wires may be readily installed or replaced when worn or broken.

Also, an improved lawn trimmer of the character described has been provided wherein the cutting head of the trimmer is reversible in position on the carrier or frame so that the trimmer may be used for trimming in opposite directions along the edges of walks, curbs and the like. It will also be noted that means has been provided for adjusting the height of the cutting head so that the ends of the cutter wires may be correctly positioned with respect to the vegetation being trimmed, to assure proper operation. Furthermore, an adjustable shield has been provided for guarding the user against injuries by the high speed rotating cutter wires, said shield being arranged so that it is adjustable in position and functions to protect the user in either position.

The foregoing description of the invention is explanatory only, and changes in the details of the construction illustrated may be made by those skilled in the art, within the scope of the appended claims, without departing from the spirit of the invention.

What I claim and desire to secure by Letters patent is:

1. A lawn trimmer including, a frame having ground wheels, a power unit carried by said frame, an elongate supporting arm having one end pivotally carried by said frame, a housing at the outer free end of said arm, a shaft rotatable in the housing, a driving connection between the power unit and said shaft, a hub carried by said shaft and having a plurality of spaced radially extending carrier arms, said arms each having an opening formed therein near their outer end and having a slot extending between said opening and the edge of the arm intermediate the opening and the hub, elongate flexible resilient wire cutter members each having an eye loop at one end, said cutter members each having its eye loop extending through the opening in one of the carrier arms whereby each cutter member is freely swingably connected with a carrier arm so as to be freely swingable in the plane of the radially extending carrier arms and angularly with respect to said plane, said loop being of a sufficient size to permit the loop to pass along the slot from the carrier arm opening so that the cutter member may be disconnected from said carrier arm, and a retaining washer carried by the shaft and engaging the hub to cover the slot in each of the carrier arms for preventing displacement of the cutter members from the openings in said carrier arms.

2. A lawn trimmer of the character set forth in claim 1 wherein, the power unit is provided with a drive shaft and a flexible driving connection is provided between the shaft of the power unit and the shaft in the housing carrying the hub, the pivot upon which the supporting arm is mounted being in axial alignment with the shaft of the power unit whereby the arm is swingable through an arc of approximately 180 degrees in a plane vertical to the ground to permit movement of the cutter members to various adjusted cutting positions without disturbing the driving connection, and adjustable stop means is provided on the frame on opposite sides of the pivot for the supporting arm for supporting the elongate supporting arm in various positions.

3. A lawn trimmer of the character set forth in claim 1, wherein the frame is tiltable on the ground wheels so that the frame may be tilted to move the cutter members into and out of cutting position, and ground engaging means is carried by the frame spaced from the ground wheels to limit movement of the frame which moves the cutter members into cutting position, whereby the cutter members are properly positioned in cutting relationship with the ground.

4. A lawn trimmer including, an elongate frame, and axle mounted transversely of the longitudinal axis of the frame at substantially the center thereof, ground wheels on the axle beyond the edges of the frame, a smaller caster wheel mounted at each end of the frame, said caster wheels being so mounted that neither engages the ground when the frame is supported on the ground wheels in a horizontal position whereby the frame must be tilted to cause one of the caster wheels to engage in the ground, said frame being tiltable about the axle of the central ground wheels in either direction, a power unit mounted substantially centrally of the frame, an elongate supporting arm having one end pivotally supported by the frame, a cutter head carried by the other end of the supporting arm and including a rotatable shaft and flexible resilient cutter members loosely mounted on said shaft, a driving connection between the power unit and the shaft of the cutter head, and stop means on the frame arranged to be engaged by the supporting arm to adjustably support the cutter head in various cutting positions, said supporting arm being swingable through an arc of substantially 180 degrees about the pivot on the frame to move the cutter head from a position near one end of the frame to a position near the opposite end of said frame, the frame being tiltable about the axle of the central ground wheels to move the cutter members of the cutter head into and out of cutting positions at each end of the frame, such tilting movement being limited by the small caster wheels at each end of the frame.

5. A lawn trimmer of the character set forth in claim 4 wherein, a shield member is adjustably mounted on the cutter head for shielding the user of the trimmer against contact with the swinging cutter members, said shield member being shiftable when the supporting arm is swung to move the cutter head to opposite ends of the frame, and means is provided for releasably restraining said shield positioned in protective shielding position at either position of the cutter head.

SAM H. BOGGS.

REFERENCES CITED

The following references are of record in the file of this patent:

UNITED STATES PATENTS

| Number | Name | Date |
|---|---|---|
| 515,031 | Turner | Feb. 20, 1894 |
| 1,552,750 | Lain | Sept. 8, 1925 |
| 1,870,932 | Sternemann | Aug. 9, 1932 |
| 2,084,398 | Jongeneel | June 22, 1937 |
| 2,209,309 | George | July 30, 1940 |
| 2,341,486 | Swertfeger | Feb. 8, 1944 |
| 2,354,112 | Garst | July 18, 1944 |
| 2,478,813 | Esleck | Aug. 9, 1949 |

FOREIGN PATENTS

| Number | Country | Date |
|---|---|---|
| 507,243 | Germany | Sept. 13, 1930 |